United States Patent [19]
Clark

[11] 3,963,976
[45] June 15, 1976

[54] PULSED CURRENT BATTERY CHARGING METHOD AND APPARATUS

[75] Inventor: William H. Clark, Salt Lake City, Utah

[73] Assignee: Utah Research & Development Co., Salt Lake City, Utah

[22] Filed: Apr. 3, 1975

[21] Appl. No.: 564,825

Related U.S. Application Data

[63] Continuation-in-part of Ser. No. 486,308, July 8, 1974, abandoned, which is a continuation of Ser. No. 302,027, Oct. 30, 1972, abandoned.

[52] U.S. Cl.................................. 320/21; 320/23; 320/39
[51] Int. Cl.² .......................................... H02J 7/04
[58] Field of Search .................. 320/21, 20, 39, 40, 320/22, 23, 30

[56] References Cited
UNITED STATES PATENTS

| | | |
|---|---|---|
| 1,743,594 | 1/1930 | Broadfoot ............................ 320/21 |
| 3,252,070 | 5/1966 | Medlar et al. ........................ 320/21 |
| 3,487,284 | 12/1969 | Cady ................................. 320/21 X |

*Primary Examiner*—J D Miller
*Assistant Examiner*—Robert J. Hickey
*Attorney, Agent, or Firm*—Trask & Britt

[57] ABSTRACT

A pulsed current battery charging method functions to improve battery capacity characteristics of a liquid electrolyte electrical storage battery and prolong battery useful life. Pulses of charging current are applied optionally concurrent with conventional charging current. The pulse amplitude is of significant magnitude in relation to conventional small, finishing rate or trickle charge charging currents. Pulse amplitude, duration and pulse repetition rate are controllable. Apparatus designed to carry out this method includes power supply means, pulse current generating means and optional control means.

3 Claims, 8 Drawing Figures

PULSED CURRENT BATTERY CHARGING METHOD AND APPARATUS

CROSS REFERENCES TO RELATED APPLICATIONS

This application is a C-I-P of Ser. No. 486,308, filed July 8, 1974, which is a continuation of Ser. No. 302,027 filed Oct. 30, 1972, both now abandoned.

BACKGROUND OF THE INVENTION

Field

This invention relates to electrical storage battery charging methods and apparatus. Specifically, this invention provides for a method and apparatus to charge liquid electrolyte electric storage batteries by means of pulses of electrical current to increase useable battery capacity and prolong battery useful life.

State of the Art

The amount of energy available from a liquid electrolyte electrical storage battery, the amount of energy returnable after discharge, and the useful life of the battery are all affected by a variety of factors, one of which is the non-homogeneity of the electrolyte, i.e., electrolyte stratification. Specifically, in the absence of agitation or mixing techniques or apparatus, the electrolyte (acid) concentration decreases at the top of a battery cell and increases at the bottom. The electrolyte between adjacent battery cell plates available for discharge and recharge is thus limited, i.e., less than maximum. Cell plate deterioration (e.g., "whisker" or "branch" growths near the bottom of the cell plates; increased erosion at points of low electrolyte concentration) is enhanced by stratification, thereby contributing to a shorter useful battery life than ideally or practically possible.

A variety of agitation and mixing techniques are available to minimize stratification. Included among these are electrolyte mixing pumps for large batteries, platform vibration (e.g., automobile or truck), and battery overcharging procedures. Battery overcharging consists of charging the battery beyond its maximum capacity to effect the electrolysis of the water of the electrolyte solution. Relatively small charging currents are conventionally applied during battery overcharging as compared to typical charging currents and designed maximum charging currents. These small currents, sometimes referred to as the "finishing rate" or "trickle charge" current, may be specified by the battery manufacturer as well as the maximum charging current (rate).

Some of the factors which contribute to the selection of overcharging currents are: the amount of hydrogen and oxygen to be produced during overcharging, battery structure (e.g., cell plate size and material; distance between adjacent cell plates), and electrolyte characteristics, (e.g., concentration). Within the context of imparting the maximum amount of charge, selection is typically premised on a compromise whereby as much gas-induced agitation and mixing as possible is effected without causing excessive erosion in the less-concentrated electrolyte plate area. Overall plate erosion by the hydrogen and oxygen gas as it passes to the surface of the electrolyte must also be minimized. In addition the inherent explosive hazard associated with large amounts of hydrogen and oxygen may of itself be delimiting. In many cases, the net result may be inefficacious because the selected small charging current will not induce uniform mixing. A low battery current tends to flow in the top of the battery where the acid is less concentrated and the electromotive force is lower. Few gas bubbles are then generated in the lower part of the battery. Thus, the lower, more concentrated electrolyte will not be thoroughly mixed with the less concentrated. Therefore stratification is not eliminated, but only reduced.

In many circumstances, vibration, pumping and/or gassing is not practical because of the battery location or use, the cost of apparatus and the explosive dangers associated with hydrogen and oxygen. As a result, reduced battery capacity and reduced battery useful life must be accepted for lack of a practicable alternative.

SUMMARY OF THE INVENTION

The present invention provides a method and apparatus for charging, and recharging, liquid electrolyte electrical storage batteries. Pulses of charging current are applied to the liquid electrolyte battery anytime during normal charging operations although the greatest benefit occurs by application near completion of battery charging operations. The pulse amplitude and duration are selected so that sufficient current is available to insure that electrolytic gas production will occur substantially uniformly over the entire area of a battery cell plate. If the amplitude is too small, the current will pass through the less concentrated, high resistance (but low electromotive force) electrolyte near the cell top. With large pulse magnitudes, many times the finishing rate or trickle charge levels, for example, about 100 to 5,000 times these levels, the electromotive force differences between lower and higher concentrations decreases in significance and the effect of resistance differences increases. More current will therefore pass through the low resistance, high concentration area. Thus, gas production is enhanced in the area where it is most important to induce a mixing agitation motion, viz: the higher concentrated electrolyte area. Pulse duration must be made long enough to insure adequate gas generation, but short enough so that the harmful effects of high current are not encountered. Similarly, pulse repetition rate must be controlled to produce an integrated average current over the time that equates to a selected relatively small constant charging current, or a current which falls within battery manufacturers finishing rate or trickle charge specifications. The net result is improved agitation and mixing with less gas generation. Accordingly, the use of costly mechanical agitation mixing apparatus may not be required, and the explosive hazards of excessive gas generation avoided. Moreover, the amount of energy available for discharge and recharge is increased and battery useful life prolonged.

An apparatus to carry out the pulsed-current charging method is comprised of power supply means, pulse current generating means and optional control means. The pulsed current charging apparatus may be operated independently or in combination with conventional battery charging apparatus.

DESCRIPTION OF THE DRAWINGS

In the drawings, which illustrate what is presently regarded as the best mode for practicing the invention.

DESCRIPTION OF THE ILLUSTRATED EMBODIMENT

Figure 1:
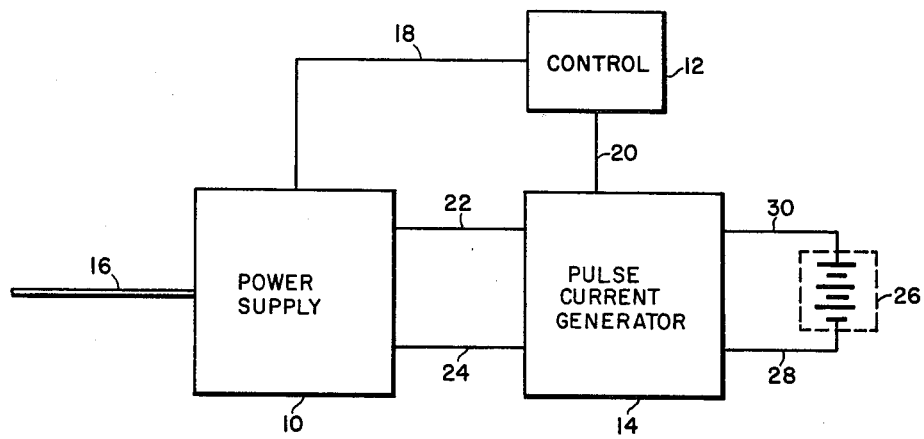
FIG. 1 is a simplified block diagram of a pulsed current charging apparatus.

As illustrated by the simplified block diagram of FIG. 1, a pulsed current charging apparatus includes power supply means 10, control means 12, and pulse current generating means 14. The power supply means receives electrical power (e.g., 115 volt 60 hz) from an external source via cable 16. Control means 12 receives control power from power supply 10 over at least one control conductor 18, and sends control signals to the pulsed current generating means 14 over at least one conductor 20 to control pulsed current generating means operation. Pulsed current generating means 14 receives primary power from power supply 10 through primary power conductors 22 and 24 and supplied a pulsed current output to battery 26 via conductors 28 and 30. The pulse duration, amplitude and repetition rate of the pulsed current output is controlled by control means 12. Pulse amplitude may also be controlled (separately or concurrently) by providing power supply 10 with means to permit adjustment of the power supplied to pulsed current generating means 14.

Figure 2:
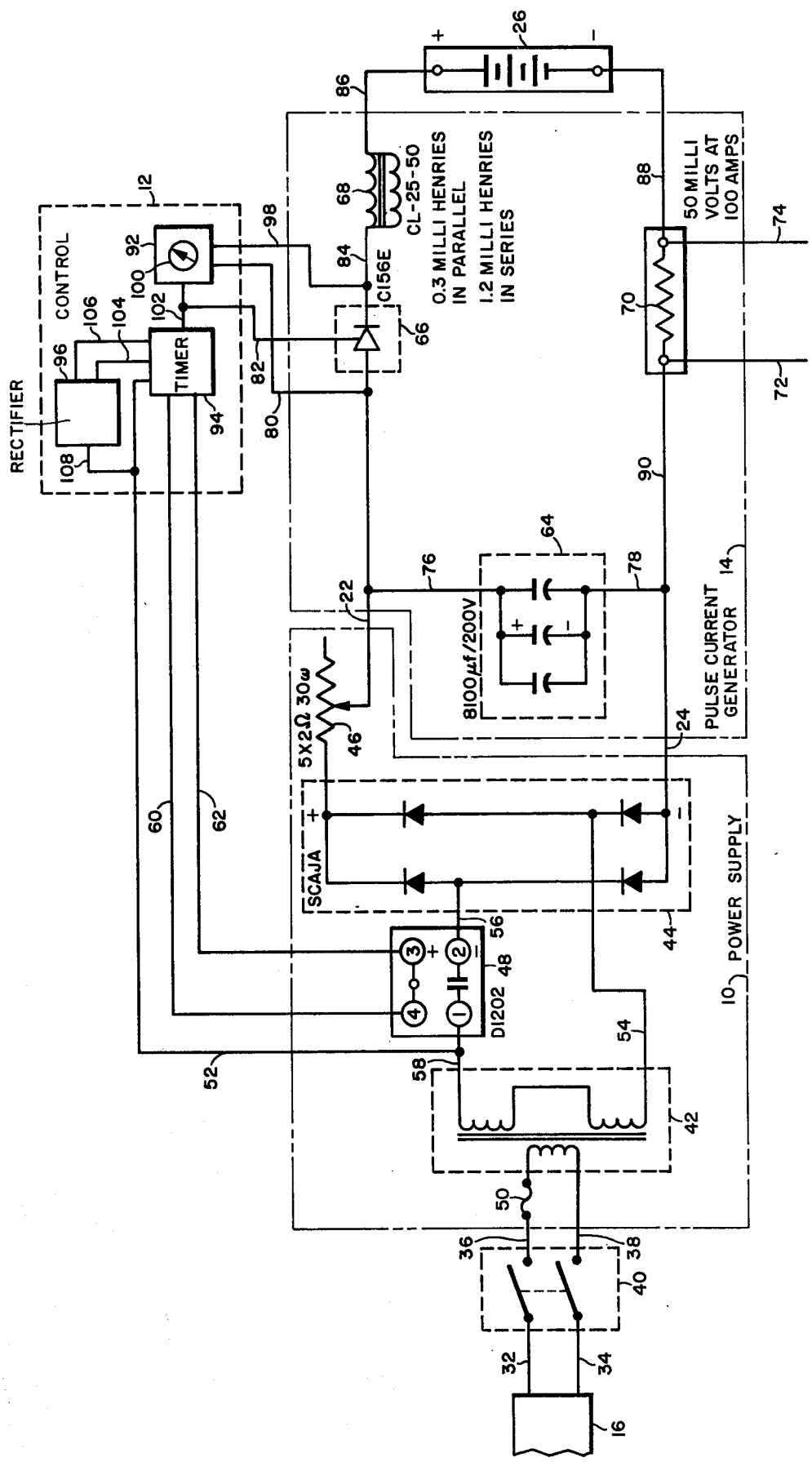
FIG. 2 is a detailed schematic of a pulsed current charging apparatus.

Refering now to FIG. 2, which is a detailed schematic of a pulsed current charging apparatus of this invention, power supply 10 receives 115 volt 60 hz external power from cable 16 via conductors 32, 34, 36 and 38, and through switch means 40. An additional conductor (not shown) may be added to provide for ground protection.

As illustrated in FIG. 2, power supply 10 includes transformer means 42, rectifier means 44, adjustment means 46, and solid state relay 48. A fuse 50 is also provided for overload protection. The power supply 10, as here shown and described in more detail below, serves to receive external power and convert it for use in other components of the apparatus. It is to be noted that a variety of power supply devices, circuits or apparatus may prove adaptable for use or more suitable for a particular use in this invention. For example, commercially available solid state circuits or a convention direct current generator may be employed as the power supply 10.

In the power supply 10 illustrated in FIG. 2, the transformer means 42, which as shown is a magnetic core transformer, receives the external power over conductors 36, 38 and transforms it into an a.c. control power signal supplied to control means 12 over conductor 52. The transformer means 42 also supplied power to rectifier means 44 via conductors 54, 56 and 58 and acts as a ground isolation device.

The solid state relay 48, which is in series between conductors 56 and 58, receives d.c. control power from control means 12 via conductors 60 and 62. The solid state relay 48 cuts off the power supply 10 for a very short period of time (e.g., about one half second) after a pulse of current is supplied to battery 26 by pulse generating means 14. This increases apparatus reliability by insuring that the silicon controlled rectifier (SCR), used as switch means 66 (which passes the current pulse) returns to its non-conducting state. The direct current output of rectifier means 44, which may be varied by varying the resistance of adjustment means 46, is supplied to pulse current generating means 14 via conductors 22 and 24.

The pulsed current generating means 14 depicted in FIG. 2 includes capacitor means 64, switching means 66 and inducer means 68. A small shunting resistor 70 may also be included to provide for output signal monitoring via conductors 72 and 44. Capacitor means 64, may be of fixed or variable capacitance depending on application. If variable capacitance is desired, it may be selected electrically and/or mechanically (not shown) by control means 12. The capacitor means 64 is charged by the power supply 10 through conductors 22, 24, 76 and 78. When the control means 12 senses the existence of a predetermined voltage across capacitor means 64 (via conductor 80), it causes switch means 66 to change to its conducting state, thus permitting the charge built up in capacitor means 64 to pass through in the form of a pulse of electrical current. Power supply 10 is then cut off by the solid state relay 48. The current in switch means 66, and SCR in this embodiment, then goes to zero. The SCR is thus returned to its non-conducting state. After a very short period of time (e.g., about one-half second in this embodiment), the power supply 10 is switched on by the solid state relay 48. The switching means 66 will then remain open (non-conducting) until the control means 12 again senses the existence of the predetermined voltage across capacitor means 64, and the cycle repeats itself. As shown, the switching means 66 is electrically controlled by control means 12 via conductor 82. It is recognized that a variety of switching devices may be adapted to the circuit to achieve the same result.

Figure 3:
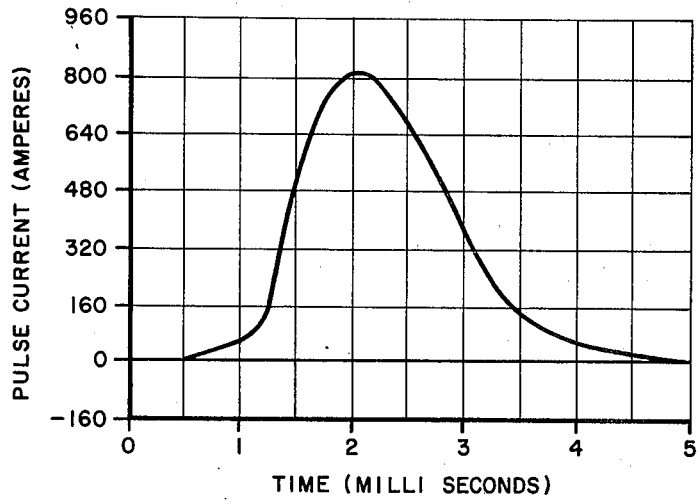
FIG. 3 is a graphical presentation of a pulse of current obtainable from the apparatus of FIG. 2.

After a pulse of current has been gated through switching means 66, it passes through inductor means 68 which shapes the pulse, and then to the battery 26 under charge. Necessary conductive connection is made through conductors 84, 86, 88 and 90, and through shunt resistor 70. Connection to the battery may be fixed or removeable depending on the circumstances as convenient to the user. The inductor means 68, shapes the pulse passing through switch means 66 into a distorted sine wave as shown in FIG. 3. A variety of pulse shapes may be employed as well as no pulse shaping whatsoever. A distorted sine wave pulse is particularly preferred because gas generation is less erosive at the instant of application to the plate of the battery 26 under charge than a non-shaped pulse. Use of the distorted sine wave pulse also extends copious gas generation with concomitant improved agitation and mixing over a finite period of time without extending it to a point where the amount of gas generated would be unacceptable. It is to be understood, however, that the pulse shape may vary substantially and that the important characteristic of the pulse is to have a certain maximum current for a particular duration. The inductors in series with the SCR regulates the maximum current and pulse duration and is desired because the inductance of a particular battery may not be known.

The control means 12 as shown includes a voltage comparator 92, a timer 94 and rectifier means 96. The voltage comparator senses the voltage on both sides of switching means 66 when it is in a non-conducting status via conductors 80 and 98. When a particular voltage ratio as selected on selector dial 100 is obtained, the voltage comparator 92 simultaneously places switching means 66 in the conducting state via conductor 82 and initiates timer 94 operation via conductor 102. For the battery 26 under charge in this embodiment (16 volt, 600 ampere-hour) a preferred voltage difference is about 5 to 25 volts. That is, the voltage comparator 92 actuates the SCR 66 whenever capacitor voltage exceeds battery voltage by about 5 to 25 volts.

Upon initiation, timer 94 permits d.c. power received from rectifier means 96 via conductors 104 and 106 to pass through to solid state relay 48 and thereby activate it. Concurrently preset electrical timing is commenced. Upon passage of a specified period of time (about one-half second in this embodiment), timer 94 interrupts the d.c. power passing to solid state relay 48, thus permitting it to close and reinitiate capacitor means 64 charging.

The timer 94 functions may be performed by a variety of electrical and electro-mechanical devices well known to the art. For example, a simple capacitor with an appropriate time constant may be conductively, cooperatively combined with a relay actuated contact device in a generally well known manner. A simple agistat relay system may also be used. The rectifier means 96, which receives power over conductor 108 may be one of a variety of rectifiers well known to those skilled in the art. Also, a wide variety of rectifiers are commercially available which may be suitably adaptable for use (e.g., solid state diode rectifier). The voltage comparator 92 may also be one of a variety commercially available or otherwise known to those skilled in the art.

FIG. 3 graphically depicts a typical pulse of current generated by the apparatus of FIG. 2. The pulse as depicted is adapted to be applied to a 16 volt, 600 ampere-hour, liquid-electrolyte battery. Typical trickle charge or finishing rate values for a battery of this type may be in the range of about 0.5 to about 3 amps. The amplitude of the pulse is a large multiple of those values, and as here shown over 800 times the selected trickle charge rate of 1 ampere. Depending on the battery under charge, amplitudes may vary from about six to several thousand times, although preferably from about 100 to about 5,000 times the safe recommended small charging rates. Better results, however, may be obtained when the actual peak value (in amps) of the current pulse is in the vicinity numerically of the battery ampere-hour capacity. Thus, it is noted that the approximate 800 ampere peak of the pulse is in the vicinity of 600 amperes for the 600 ampere-hour battery under charge.

For the apparatus of FIG. 2, the selected trickle charge rate of 1 amp is obtained by setting pulse repetition rate for the pulse of FIG. 3 at 1 every 3 seconds. Pulse duration is typically from about one to about 20 milliseconds and is preferably about one-five thousandth to about one-one hundredth the pulse repetition rate. Pulse repetition rate may be controlled by controlling the capacitance and thus the charging time constant of the capacitor means 64 (FIG. 2). Alternatively, control means 12 may be provided with time control means (e.g., agistat relay) for directly controlling switch means 66 independently or in combination with capacitance control. Pulse discharge alternately may be automatically controlled by use of a solid state switching component, by providing for timed switch operation, or by use of gas tube switching components. The solid state switching device used for switching means 66 is preferable, although those skilled in the art will recognize that a variety of electronic and electrical circuits and components may be readily employed to accomplish the switching function. As shown in FIG. 2, amplitude control is preferably affected by controlling both the size of the capacitance means 64 and the voltage to which it is charged.

The number of controllable factors as above discussed, permits selection of a pulse current optimum for a particular application. conveniently control or regulation of the apparatus is provided in terms of the average current ($I_{ave}$) supplied for a given set of parameters where average current is the time integrated value of the pulse current. This is because $I_{ave}$ is more easily correlated to the characteristics of the battery under charge. Specifically, $I_{ave}$ should fall within the trickle charge or finishing rate values, or within the selected small charging current value of the battery under charge. A simple cascading or ganged switching arrangement in the control means will allow control in this manner.

Upon application of the pulse of FIG. 3 to the battery under charge as described, extensive short term electrolysis is induced. The high current, even though present for only a short period of time, is essentially unaffected by the electromotive force variances in the battery existing by virtue of non-uniform electrolyte concentration. Therefore, gas is produced substantially uniformly throughout the battery and over the entire area of each battery cell plate. Further sufficient gas is generated, by virtue of the high current, to insure that adequate quantities of gas are driven into the electrolyte and away from the plates. Thus, agitation and mixing through gas bubble movement is induced.

Figure 4:
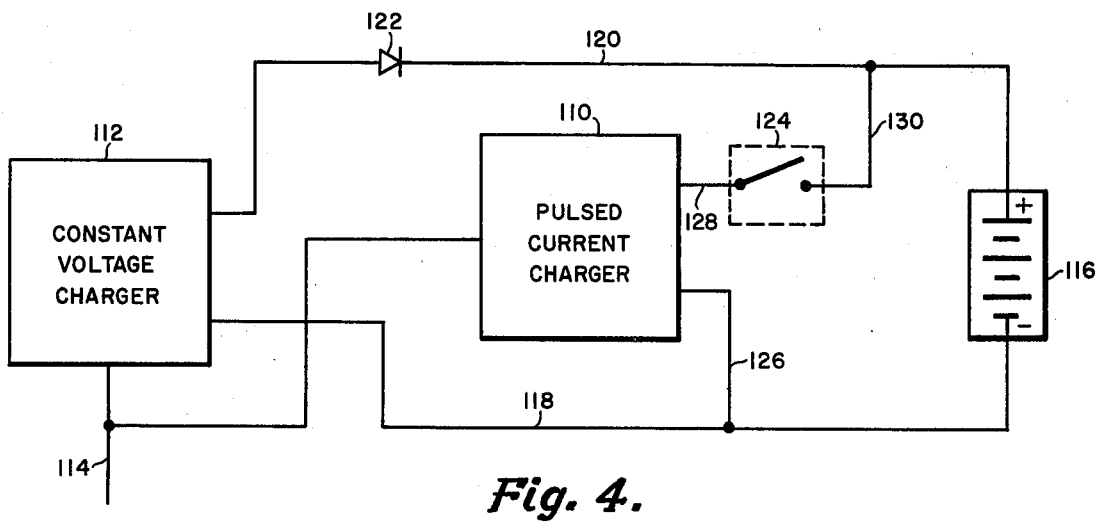
FIG. 4 is a block diagram illustrating a combined pulsed current and constant voltage battery charging system.

FIG. 4 illustrates a battery charging apparatus which includes both a pulsed current charging apparatus 110 and a conventional constant voltage charging apparatus 112. The constant voltage charger 112, which receives external power over conductors 114, generates a constant voltage/variable current charging program and applies it to battery 116 through conductors 118 and 120. The semiconductor 122 permits current to travel to the battery 116 and prevents current from the pulsed current charger 110 from flowing to the constant voltage charger 110 from flowing to the constant voltage charger 112. Switch means 124 permits selective operation of the pulsed current charger 110 which is conductively connectable to conductors 118 and 120 via conductors 126, 128 and 130.

Figure 5:
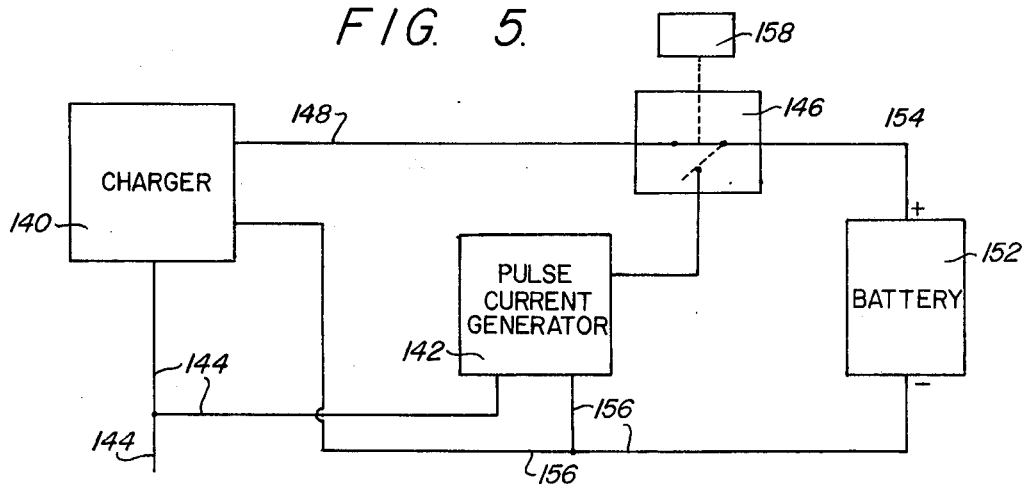
FIG. 5 is a block diagram illustrating an alternate preferred embodiment having a pulse current generator combined with a conventional battery charger.

It is recognized that a variety of charging apparatus, which generate different types of charging programs, may be coupled with a pulsed current charger as illustrated in FIG. 4 to accomplish the pulse charging method of this invention. For example, a conventional battery charger may be coupled with a pulse generator so that a combined charging program may be applied to a battery. FIG. 5 is a simplified block diagram illustrating one such combination. Electrical power from an external source is supplied to the conventional battery charger 140 and to a pulse current generator 142 of the type illustrated in FIG. 2 over conductors 144. The charger 140 output is supplied to switching means 146 over conductor 148. The output of the pulse current generator 142 is supplied to the switching means over conductor 150. The switching means 146 has an output which is supplied to battery 152 over conductor 154. A common ground conductor 156 interconnects the battery 152, the charger 140 and the pulse current generator 142. The switching means 146 switches between the output of the charger 140 and pulse current generator 142 in accordance with a predetermined charging program. Switch control means 158 may control the switching means 146 either electrically or mechanically to produce the desired program.

Figure 6:
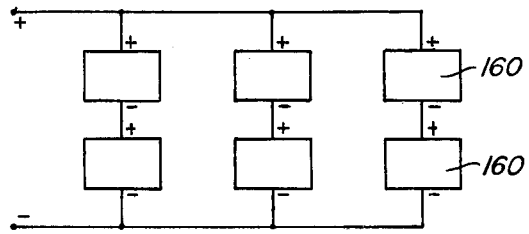
FIG. 6 is a block diagram of a battery arrangement to be charged by the embodiment illustrated in FIG. 5.
Figure 7:
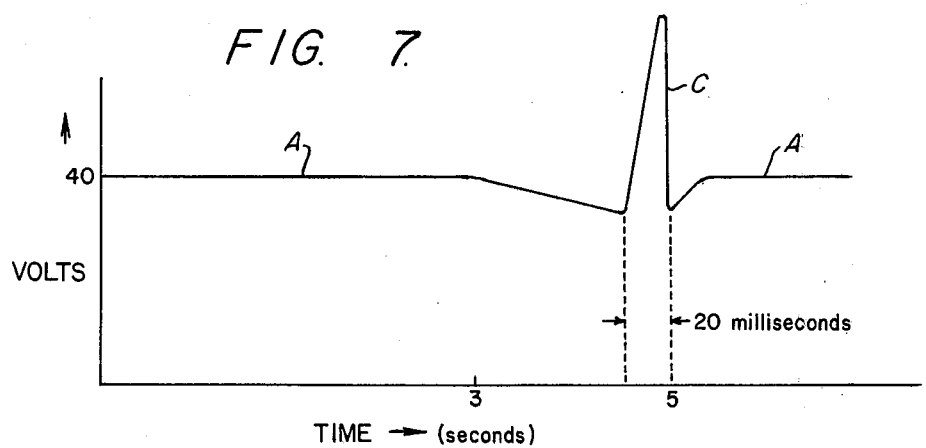
FIG. 7 is a graph of voltage versus time illustrating battery voltage during a selected charging program.
Figure 8:
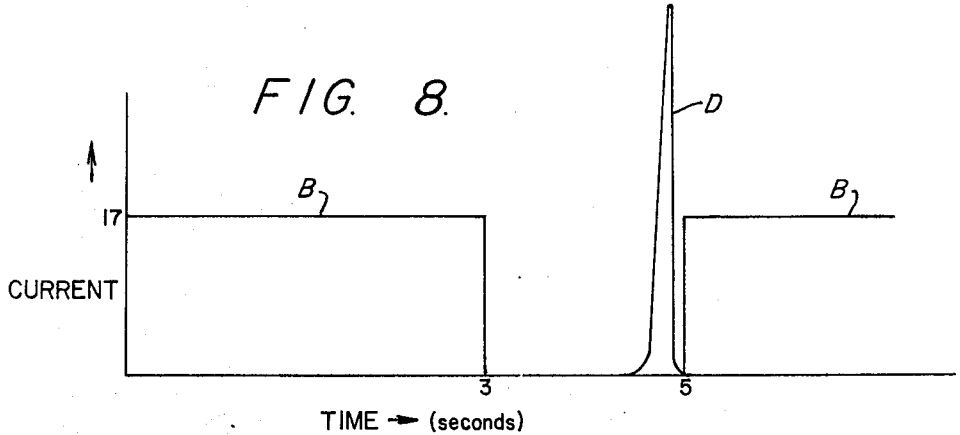
FIG. 8 is graph of current versus time illustrating charging current during a selected charging program.

The charging program to be selected will vary with the type of battery as well as with other factors such as tolerable gassing rates, available power and the like. For example, FIG. 6 illustrates a battery arrangement (152) comprised of 6 separate 18 volt lead acid batteries having a constant load of about 14 amperes. A highly preferred charging program for such a battery arrangment is illustrated by the graphs of FIGS. 7 and 8. The charger 140 is connected through the switching means 146 to supply a charging current of about 17 amperes at about 40 volts for a period of about 3 seconds as shown by curves A (FIG. 7) and B (FIG. 8). At the end of 3 seconds the switch control means 158 causes the switch means 146 to open the circuit between the charger 140 and the battery 152. The battery voltage thus starts to drift downward from 40 volts towards battery arrangement's (FIG. 6) 36 volt fully charged voltage. During the drift of voltage, the pulse current generator charges its capacitor 64 (FIG. 2) of 0.312 farads nominal capacitance with about 20 coulombs of electricity. Near the end of a 2 second drift period, the switching means 146 is operated by the switch control means 158 to monentarily close the circuit between the pulse current generator 142 and the battery 152. A pulse of about 1,500 amperes peak (300 amperes per battery 160) and millisecond duration having an average value of about 4 amperes is supplied to the battery 152. The switch control means 158 then causes the switch means 146 to reconnect the charger 140 to the battery 152 to repeat the cycle. The switch control means 158 and switch 146 may be devices similar to the SCR 166 and control means 12 illustrated in FIG. 2. The pulses C and D illustrated in FIGS. 7 and 8 respectively are not proportional to their actual values for purposes of illustration. The pulses are distorted sine waves lower in value and longer in duration than illustrated in FIG. 3 because the battery arrangement of FIG. 6 has a high reflected inductance. It should also be noted that the pulse repetition rate of this embodiment is one every 5 seconds and the pulse duration about 1/10 of the pulse repetition rate. Pulse duration in comparable embodiments could be as high as 50 milliseconds.

It is within contemplation that portable units with removable battery connections may be devised as well as units fixedly adapted to a particular application or to a particular battery. As above illustrated and described, a pulse current charging apparatus may simply be devised using the teachings of this invention for a particular application. Devices may also be available where all means of control (i.e., control means and/or adjust means as hereinbefore described) may be eliminated by appropriate selection of components. That is, those skilled in the art will recognized that preselected component values and automatic pulse generating components may be desirable for a particular application. The vast number of potential applications of this invention suggest a variety of electrical and chasis configurations and embodiments not illustrated herein.

Operation of the pulse current apparatus during the early stages of a battery charge after the battery under charge has been deeply discharged is not particularly of much advantage; although operation during such a time is in no way disadvantageous. In fact, it is contemplated that some embodiments of combined conventional and pulse current apparatus may be so operated to provide for simplified use and control. The preferred operational application of the method and apparatus of this invention is at a point where a battery is very nearly fully charged. Specifically, a charged battery that has been idle as well as a discharged battery which is being returned to the charged state are equally capable of responding to the method and apparatus of this invention. In fact, the method herein disclosed is particularly useful in any situation where circumstances dictate, inter alia, the need for mixing and agitation along with reduced or minimal gas production.

It is to be understood those skilled in the art recognize the usefulness of the method and apparatus of this invention, and are capable of devising a variety of apparatus employing the principles and teachings of this invention.

I claim:

1. A battery charging apparatus comprising:
   a. an external source of electrical power;
   b. a conventional battery charging apparatus to supply a conventional charging current as an output and conductively connected to said external source of electrical power;
   c. a pulse current generator having an output to supply a pulse of electrical current which is of large amplitude as compared to the amplitude of small charging currents applied to said battery when battery overcharging procedures are being employed, said pulse current generator being conductively connected to said external source of electrical power;
   d. switching means conductively connected to said conventional battery charger, to said pulse current generator and to a battery to switch the output of said conventional battery charging apparatus and the output of said pulse current generator into electrical circuit with said battery; and
   e. control means connected to said switching means to cause said switching means to switch the output of said conventional battery charging apparatus and the output of said pulse current generator to be in electrical circuit with said battery to impart to said battery a preselected program of conventional and pulsed charging current wherein said conventional charging current and said pulse charging current alternate at a selected constant rate.

2. The apparatus of claim 1 wherein said pulse has an amplitude from about 100 to about 5,000 times said small charging current and a duration from about one-half (0.5) a millisecond to about 50 milliseconds.

3. The apparatus of claim 2 wherein said conventional charging current is applied to said battery for a period of about 3 seconds out of every 5 seconds and said pulse applied to said battery near the end of the 2 second periods existing between said 3 second periods of conventional battery charging current.

* * * * *

UNITED STATES PATENT OFFICE
CERTIFICATE OF CORRECTION

Patent No. 3,963,976                Dated June 15, 1976

Inventor(s) William H. Clark

It is certified that error appears in the above-identified patent and that said Letters Patent are hereby corrected as shown below:

Col. 3, line 14, between "is" and "graph" insert ---a---;

Col 6, line 19, change "conveniently" to ---Conveniently---;

Col. 8, line 27, change "teachines" to ---teachings---.

Signed and Sealed this

Sixteenth Day of August 1983

[SEAL]

Attest:

Attesting Officer

GERALD J. MOSSINGHOFF

Commissioner of Patents and Trademarks